United States Patent [19]
Skrzypchak

[11] Patent Number: 6,070,908
[45] Date of Patent: Jun. 6, 2000

[54] DIAMOND PLATE ALUMINUM FENDER EXTENSION

[76] Inventor: Edward T. Skrzypchak, 18 Wilson Ave., Rothschild, Wis. 54474

[21] Appl. No.: 08/954,624

[22] Filed: Oct. 20, 1997

Related U.S. Application Data

[60] Provisional application No. 60/029,139, Oct. 21, 1996.

[51] Int. Cl.[7] .................................................. B62B 9/16
[52] U.S. Cl. ........................ 280/847; 296/198; 280/848
[58] Field of Search .................................... 280/847, 848, 280/849, 154, 851; 296/198, 151, 207; 293/128, 120, 155

[56] References Cited

U.S. PATENT DOCUMENTS 4,169,608  10/1979  Logan .
4,706,980  11/1987  Hawes et al. .
4,784,430  11/1988  Biermacher .
5,074,573  12/1991  Dick .
5,238,268  8/1993   Logan .
5,340,154  8/1994   Scott .

FOREIGN PATENT DOCUMENTS 794419    2/1936  France .
1284583   8/1972  United Kingdom .
1291114   9/1972  United Kingdom .

*Primary Examiner*—Richard M. Camby
*Attorney, Agent, or Firm*—Richard C. Litman

[57] ABSTRACT

A diamond plate aluminum fender extension which is customized to fit the fenders and wheel wells of vehicles to add appearance and necessary protection to the fender system by extending the coverage of the fenders assuring the shielding of the wheels. The extension is cut and assembled from two sections of aluminum plate that has a deep embossed attractive diamond design pattern. The two sections of edge trim and mud flap are then set into the fender wheel well, extending the enclosure of the wheels, and producing a neat and attractive appearance as well as a fender protector.

17 Claims, 3 Drawing Sheets

DIAMOND PLATE ALUMINUM FENDER EXTENSION

CROSS-REFERENCE TO RELATED APPLICATION

This application claims the benefit of U.S. Provisional patent application Ser. No. 60/029,139, filed Oct. 21, 1996.

BACKGROUND OF THE INVENTION

1. Field of the Invention

The present invention relates to a vehicle fender extension. The fender extension is made from sheet stock of malleable aluminum plate with an embossing of a diamond pattern, more commonly known as diamond plate, which can be cut and configured to fit the contour of all vehicle wheel openings. Once installed, it provides a wheel shield protection as well as an aesthetic complement on a peripheral edge of the vehicle fender.

2. Description of Prior Art

Fender extensions and items that perform the function of extensions have been the subject of earlier patents. Some of the more relevant prior art are described in U.S. Pat. No. 4,169,608 of Logan, U.S. Pat. No. 4,706,980 of Hawes et al., U.S. Pat. No. 4,784,430 of Biermacher, U.S. Pat. No. 5,074,573 of Dick, U.S. Pat. No. 5,238,268 of Logan, U.S. Pat. No. 5,340,154 of Scott, and Foreign Patent Number 794,419 of 2/36 from France and Foreign Patent Numbers 1,284,583 of 8/72 and 1,291,114 of 9/72, both from Britain.

Of particular interest in the above patent references are the two patents to Logan, which disclose both a fender extension that can be made of a ferrous or a non-ferrous material, and a modular fender extension that can be used on automobile door edges that form part of the fender assembly. The patent to Scott is an improvement on Logan, and discloses a fender flare attachable by bonding to an automobile fender to provide an aesthetic appeal.

Biermacher has devised a clip-on system for a fender dressing. Hawes discusses a fender flap to be attached to protect from the spray of a bare wheel. Dick describes a fender which pivots with the wheel. The foreign patents describe classic mud guards, flaps, and fender to rear door interfaces. These above-listed patents, were selected to illustrate the variety of patents in the field of vehicle fender extensions. All the above patents are dependent on a prefabricated assembly, and do not inexpensively accommodate the desired results or the variety of fender shapes currently on the market. What is lacking is an inexpensive fabrication process which utilizes an attractive generally available raw stock.

None of the above inventions and patents, taken either singularly or in combination, is seen to describe the instant, invention as claimed. Thus, a fender extension made of diamond plate aluminum stock solving the aforementioned problems is desirable.

SUMMARY OF THE INVENTION

There was a time in the early history of the automobile that there were limited varieties of cars available. A case in point is the model T Ford, which Ford would deliver in any color "as long as it is black". Current competitive world wide production of vehicles has resulted in such a variety of models, that accommodating a stock of matching parts has become not only a warehousing problem, but a significant tooling expense.

Generally, popular after-market accessories, which include, fender extensions, are available in auto parts retail stores, but more and more automobile owners are finding that fender extension accessories available in such retail stores are too limited to fit the specifications desired. Therefore, a major source of fender extension product is the skill of a craftsman with shop facilities. Extensions accommodated to fenders are popular because they not only result in a high visibility customization, but (1) add to the streamlining and aesthetic design of the vehicle, (2) provide additional wind shielding to deflect the corrosive and abrasive road muck away from the body of the vehicle, and (3) also protect the fender itself from contact with barriers which may damage the integrity of the fender.

Moreover, some truck owners have elected to customize their vehicles with oversized tires which extend beyond the wheel well. In response to the hazard created by a section of a tire extending beyond the width of the associated enclosures, some states have instituted laws which require that the fenders be extended to assure public protection from road debris that may become projectiles. Such latitude of customization and mandatory extension requirements create a need for craftsmen and materials with inherent versatility. Of course, the more the craftsman can accommodate the objectives of the vehicle owner in the design of the fender extender, the more the end product will meet the. specification's objectives.

An extremely versatile flat metal stock known as diamond plate is generally available in gross. The jargon "diamond plate" comes from the fact that the stock is deeply embossed with a contiguous pattern of diamond shaped design. Diamond plate sheets come in various grades of aluminum which assures malleability and other intrinsic features. It is easily cut and tooled to mold and fit to complex shapes such as fenders. An ideal low cost vehicle craftsman stock is thus available, which can be custom fashioned to fenders in harmony with the skill of the artisan.

Accordingly, it is a principal objective of the present invention to provide a customized automotive fender extension accessory.

Another objective of the present invention is to provide a customized automotive fender extension accessory which can be readily installed by artisans in the trade.

Yet another objective of the present invention is to provide a customized automotive fender extension comprising an embossed diamond plate aluminum.

It is an objective of the invention to provide improved elements and arrangements thereof in a diamond plate aluminum fender extension for the purposes described which is inexpensive, dependable and fully effective in accomplishing its intended purposes.

These and other objectives of the present invention will become readily apparent upon further review of the followings specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
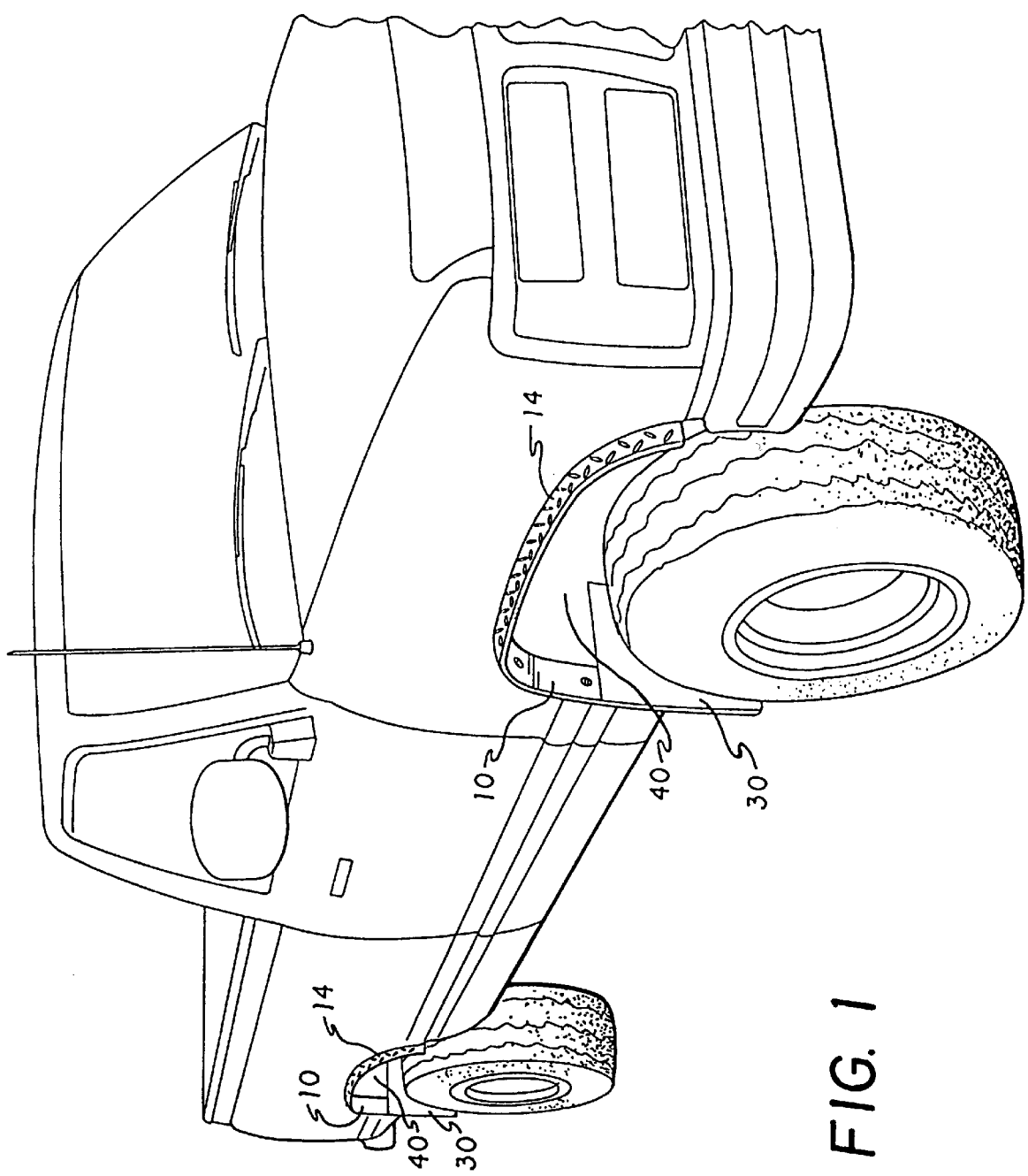
FIG. 1 is a perspective view of a diamond plate aluminum fender extension installed on a side of a vehicle partially shown.

The present invention of a diamond plate aluminum fender extension is assembled from aluminum plate sheet stock available under the generic name of diamond plate. It is the objective of the invention to trim pieces of said diamond plate out of the sheet stock to fit to the wheel wells of vehicles in such a manner as to shield the wheel and complement the appearance of the vehicle as shown in FIG. 1. The shielding assures that the entire tire is encompassed by an enclosure of the original wheel well and the aluminum diamond plate added as an extension of the fender.

Generally, two pieces are cut from the diamond stock; the edge trim 10 and the mud flap 30. As shown in FIG. 1, the edge trim 10 increases the width of the wheel well by extending the fender outward by a fairing 14, and the mud flap 30 increases the wheel well depth by extending the wheel well enclosure downward.

The fender defines the outside access to the wheel well 40 which has a wheel well skin 42 inside it to enclose the original equipment tires. The wheel well dimensions may be inadequate to accommodate oversized tires. To shield the vehicle and adjacent vehicles from the spray and projectiles which may be propelled by a spinning tire, the fender must be extended in width and depth.

The first piece, the edge trim 10, is wide enough to securely attach to the inside edge of the internal fender flange 12 and to horizontally extend as a fairing 14 outside of the original fender width. The outwardly extending fairing 14 is dimensioned to shield the tire and give the vehicle a pleasing appearance. Generally, the shaped edge of the fender has an internal flange 12 to add rigidity to the that edge. However, if the internal edge is missing or inadequate to supply a junction interface for a joining to the edge trim 10, as discussed below, the fender edge must be supplemented, as the art provides, to serve as an internal flange 12. The edge trim 10 must also be long enough to run from the fender's lower rear edge 16 to the fender lower front edge 18 when, contoured into the fender's curvilinear section 20. The fender's curvilinear section 20 is that upper portion of the fender wheel well access and varies among different models of vehicles. It is best to cut the length of the edge trim 10 generously, center it on the curvilinear section 20, and then work it snug up against the, fender outline. The overage on the length of the edge trim is then marked, cut and dressed to neatly terminate at the fender's lower, rear edge 16 and the fenders lower front edge 18.

Figure 2:
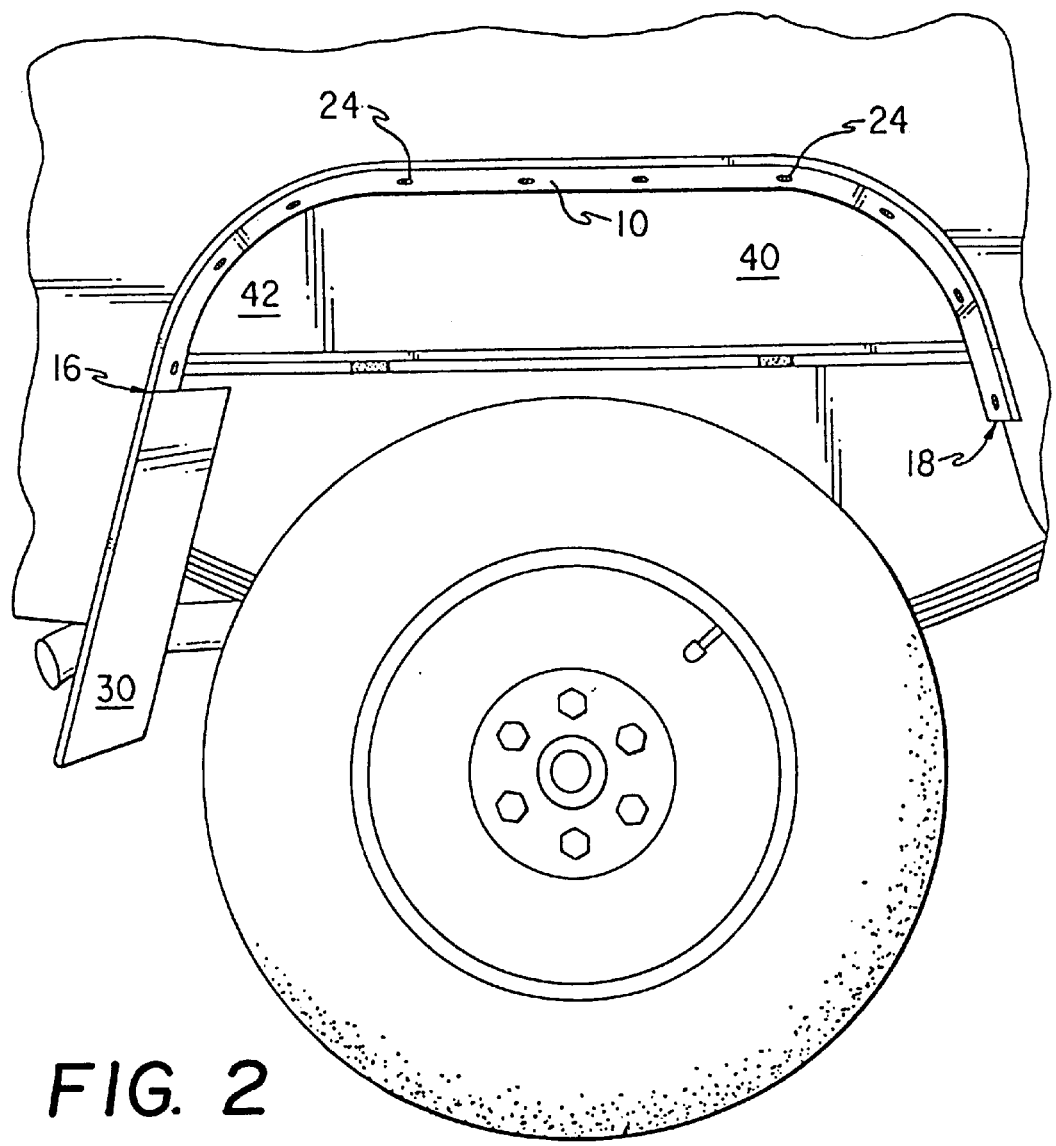
FIG. 2 is an enlarged side view of a diamond plate aluminum, fender extension installed on a rear right wheel well.
Figure 3:
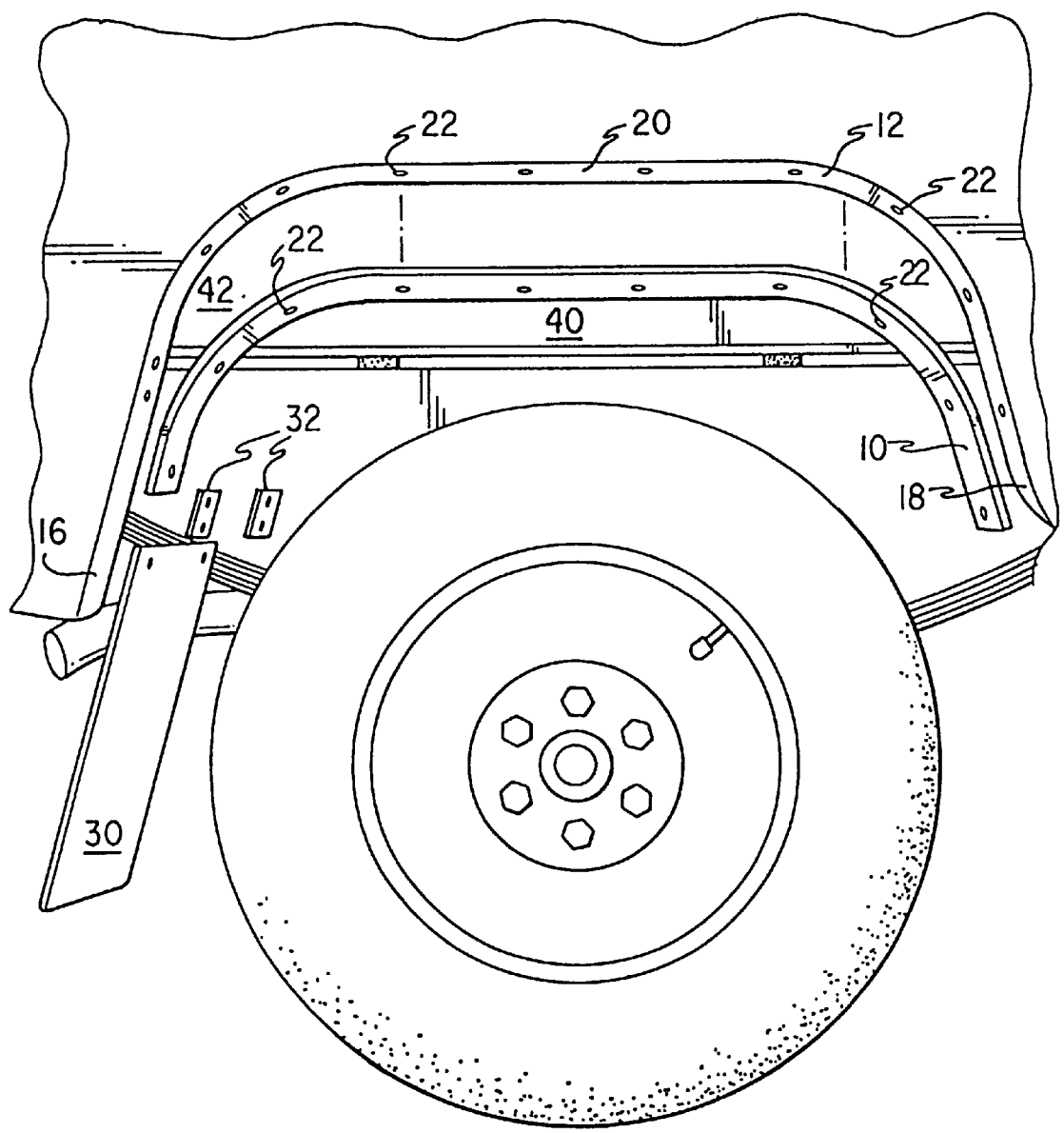
FIG. 3 is an exploded side view of the diamond plate aluminum fender extension shown in FIG. 2.

The detailed assembly of the fender extender is shown in FIGS. 2 and 3. A multiplicity of throughbores or holes 22 are drilled. through the edge trim 10 and its cooperating fender's internal flange 12. Fastener means 24 are then inserted through the edge trim 10 and the mated internal fender flange 12. The fastener means can be pop rivets, self tapping screws, or nuts and bolts as the circumstances permit. Likewise, the joining of the edge trim 10 can be accomplished by welding or brazing. The objective is to get a secure contoured strip of diamond plate to the fender edge outline with enough fairing 14 extending beyond the original width of the fender to shield the tire and to offer a neat appearance to the fender.

Next, the mud flap 30 is cut from the diamond plate stock. The mud flap 30 extends from the fender's lower rear edge 16 to below the wheel well 40 to a predetermined distance. This predetermined distance must be of aesthetic proportions and offer adequate road clearance. But more importantly, the mud flap 40 must drape low enough to assure potential projectiles from the oversized tires do not clear the rear of the vehicle in such a trajectory to do damage to following vehicles. It should be noted that the diamond plate design of the mud flap 30 is present on a side not visible in the drawings.

Again, the mud flap 30 is trimmed and dressed to fit adjacent to the rear extremity of the edge trim 10. Multiple throughbores or holes 22 and fastener means 24 secure the mud flap 30 in the wheel well 40. In some installations, it may be necessary to add additional firm securement means for the mud flap 30. By way of example only, brackets 32 (FIG. 3) or a similarly functional structure can be added to ensure that the mud flap 30 is substantially secured in the wheel well 40, as often as the metal or plastic enclosure comprising the wheel well skin 42 does not have enough structural integrity to support a piece of metal the size of a mud flap. Note that the mud flap 30 is generally cantilevered from the wheel well 40, and is subject to the forces of high air velocity and projectile impact as well as occasional encounters with high curbs.

It is to be understood that the present invention is not limited to the embodiments described above, but encompasses any and all embodiments within the scope of the following claims.

I claim:

1. A diamond plate aluminum fender extension cut from diamond plate aluminum stock for attaching to a vehicle wheel well fender with an internal flange comprising:

an aluminum edge trim piece embossed with a diamond plate design being wide enough to accommodate a fairing and a junction interface to a contoured internal flange of a vehicle wheel well fender, and being long enough to contour into a curvilinear edge of a vehicle wheel well fender from a lower front edge to a lower rear edge by being cut from diamond plate aluminum stock;

a plurality of fastening means being inserted into predetermined throughbores of throughbores in said edge trim piece and said cooperating throughbores in said contoured internal flange of said vehicle wheel well fender for attachment of said edge trim piece to said internal flange; and an aluminum mud flap embossed with a diamond plate design long enough and wide enough to clear the road and shield a portion of a vehicle body being attached to said edge trim piece at a lower rear edge.

whereby the assembly of said edge trim piece joined to said wheel well fender provides an increased partial enclosure of a wheel.

2. The diamond plate aluminum fender extension according to claim 1, wherein said plurality of fastening means being selected from the group consisting of pop rivets, self-tapping screws, and nuts and bolts.

3. The diamond plate aluminum fender extension according to claim 2, wherein said plurality,of fastening means are pop rivets.

4. The diamond plate aluminum fender extension according to claim 2, wherein said plurality of fastening means are self-tapping screws.

5. The diamond plate aluminum fender extension according to claim 2, wherein said plurality of fastening means are nuts and bolts.

6. The diamond plate aluminum fender extension according to claim 1, wherein the attachment method being selected from the group consisting of welding and brazing.

7. The diamond plate aluminum fender extension according to claim 6, wherein the attachment method being welding.

8. The diamond plate aluminum fender extension according to claim 6, wherein the attachment method being brazing.

9. The diamond plate aluminum fender extension according to claim 1, wherein a plurality of additional fastening means to join said mud flap contiguous to said edge trim piece at said vehicle wheel well fender's lower rear edge by fastening means penetrating through throughbores in said mud flap and in said contoured internal flange of said vehicle wheel well fender.

10. The diamond plate aluminum fender extension according to claim 9, wherein said plurality of fastening means being selected from the group consisting of pop rivets, self-tapping screws, and nuts and bolts.

11. The diamond plate aluminum fender extension according to claim 9, wherein said plurality of fastening means are pop rivets.

12. The diamond plate aluminum fender extension according to claim 9, wherein said plurality of fastening means are self-tapping screws.

13. The diamond plate aluminum fender extension according to claim 9, wherein said plurality of fastening means are nuts and bolts.

14. The diamond plate aluminum fender extension according to claim 1, including a bracket means being fastened for reinforcement of said attachment of said mud flap to said edge trim piece.

15. A diamond plate aluminum fender extension kit fashioned from diamond plate aluminum stock and intended for attaching to a vehicle's wheel well fender with an internal flange comprises:

an edge trim piece embossed with a diamond plate design being wide enough to accommodate a fairing and a junction interface to a contoured internal flange of a vehicle wheel well fender and being long enough to contour into a curvilinear edge of said vehicle wheel well fender from a lower front edge to a lower rear edge;

a plurality of attaching means for inserting into throughbores for joining said edge trim piece to said vehicle wheel well fender;

a mud flap, being long enough and wide enough to clear the road and shield a portion of a vehicle body, being attached to said edge trim piece at the lower rear edge thereof; and a set of instructions describing how to contour the edge trim piece against said internal flange of said wheel well, drilling throughbores through said edge trim piece to the appropriate locations of said wheel well fender, and securing the attachment means;

whereby the assembly of said edge trim to said vehicle wheel well fender provides an increased partial enclosure of a wheel.

16. The fender extension kit according to claim 15, including attaching a bracket means to reinforce the attachment of said edge trim piece to said mud flap.

17. A process of constructing a diamond plate aluminum fender extension from diamond plate aluminum stock for a vehicle wheel well fender with an internal flange which process has steps comprising:

cutting an aluminum edge trim piece embossed with a diamond plate design being wide enough to accommodate a fairing and a junction interface to a contoured internal flange of a vehicle wheel well fender;

cutting said embossed aluminum edge trim piece longer than the contour of the curvilinear edge of said vehicle wheel well fender from a lower front edge to a lower rear edge;

contouring said cut edge trim piece into the curvilinear edge of the vehicle wheel well fender against said internal flange from said vehicle wheel well fender's lower front edge to said lower rear edge;

cutting and dressing said edge trim piece to fit from said vehicle wheel well fender's lower front edge to said lower rear edge against a junction interface of said edge trim piece to said internal flange;

drilling a plurality of throughbores from said edge trim piece through said junction interface into said internal flange;

inserting and cinching fasteners selected from the group consisting of pop rivets, self-tapping screws, and nuts and bolts in said multiplicity of throughbores of said edge trim piece and said internal flange;

cutting a mud flap from diamond plate stock which is long enough to clear the road from an attachment point at said vehicle's wheel well fender's lower rear edge and wide enough to shield a portion of a vehicle body;

setting the mud flap contiguous to the edge trim at the fender lower rear edge;

drilling another plurality of throughbores from said mud flap through said vehicle wheel well fender's lower rear edge;

inserting and cinching additional fasteners selected from the group consisting of pop rivets, self-tapping screws, and nuts and bolts set into said another plurality of throughbores to join said mud flap contiguous to said edge trim piece at the vehicle wheel well fender's lower rear edge; and attaching brackets to reinforce attachment of said mud flap to said edge trim piece;

whereby the assembly of said edge trim piece and mud flap as joined to the fender provides an increased partial enclosure of a wheel.

* * * * *